(12) United States Patent  (10) Patent No.: US 10,466,989 B2
Lucco et al.  (45) Date of Patent: Nov. 5, 2019

(54) FAST PRESENTATION OF MARKUP CONTENT HAVING SCRIPT CODE

(75) Inventors: Steven Lucco, Bellevue, WA (US); Louis Lafreniere, Seattle, WA (US); Curtis Cheng-Cheng Man, Seattle, WA (US); Paul Adrian Leathers, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 481 days.

(21) Appl. No.: 13/225,132

(22) Filed: Sep. 2, 2011

(65)  Prior Publication Data

US 2013/0061128 A1  Mar. 7, 2013

(51) Int. Cl.
*G06F 17/00* (2006.01)
*G06F 8/41* (2018.01)

(52) U.S. Cl.
CPC ........................... *G06F 8/48* (2013.01)

(58) Field of Classification Search
CPC ........................................ H04L 67/02
USPC .................................. 715/200, 234
See application file for complete search history.

(56)  References Cited

U.S. PATENT DOCUMENTS

| 7,945,849 | B2* | 5/2011 | Calvert ............ G06F 17/30902 709/203 |
| 7,945,853 | B2 | 5/2011 | Kothari et al. |
| 8,001,469 | B2 | 8/2011 | Weng et al. |
| 8,285,808 | B1 | 10/2012 | Joel et al. |
| 8,639,743 | B1 | 1/2014 | Colton et al. |
| 8,650,426 | B2* | 2/2014 | Rychlik et al. ............... 713/323 |
| 8,819,649 | B2* | 8/2014 | Lafreniere et al. ........... 717/139 |
| 8,850,574 | B1* | 9/2014 | Ansel ...................... G06F 21/53 717/107 |
| 9,258,136 | B2* | 2/2016 | Verschoor ............... G06F 21/53 |
| 9,282,145 | B2 | 3/2016 | Wei et al. |
| 9,405,555 | B2 | 8/2016 | Livshits et al. |

(Continued)

FOREIGN PATENT DOCUMENTS

| CN | 1855052 A | 11/2006 |
| CN | 1855053 A | 11/2006 |

(Continued)

OTHER PUBLICATIONS

Mika Tuupola, Lazy Load Plugin for jQuery, Aug. 29, 2011, pp. 1-3 (pdf).*

(Continued)

*Primary Examiner* — Manglesh M Patel

(57)  ABSTRACT

Dynamic code generation and coordination techniques are provided for display of dynamic markup documents including script code. A code generation process is not only guided by deferral of code preparation stages and sub-stages, but also informed by various information levels possessed concerning the code itself, either through interpretation or observation of execution, to not only generate modified code, but also to generate alternative code for alternative situations (e.g., generating different loop bodies that can thereafter be readily swapped in or out depending on a given function call by the browser application). A multi-core architecture further improves user experience by asymmetrically ensuring web site presentation and functionality is prioritized for the user experience.

33 Claims, 12 Drawing Sheets

(56) References Cited

U.S. PATENT DOCUMENTS

| | | | |
|---|---|---|---|
| 9,582,599 | B2 | 2/2017 | Green |
| 9,626,197 | B1 | 4/2017 | Burciu |
| 2003/0033448 | A1 | 2/2003 | Kieffer |
| 2004/0034814 | A1 | 2/2004 | Thompson |
| 2004/0034831 | A1 | 2/2004 | Grober et al. |
| 2004/0117439 | A1 | 6/2004 | Levett et al. |
| 2005/0155022 | A1 | 7/2005 | DeWitt |
| 2005/0223359 | A1* | 10/2005 | Rao Nagaraju ....... G06F 11/362 717/124 |
| 2006/0015810 | A1* | 1/2006 | Calvert ................. G06F 17/212 715/234 |
| 2007/0016949 | A1* | 1/2007 | Dunagan ................ G06F 21/51 726/22 |
| 2007/0143672 | A1* | 6/2007 | Lipton et al. .................. 715/530 |
| 2008/0222242 | A1 | 9/2008 | Weiss et al. |
| 2008/0235325 | A1 | 9/2008 | Calvert et al. |
| 2008/0271046 | A1 | 10/2008 | Lipton et al. |
| 2008/0307394 | A1 | 12/2008 | Marchant |
| 2009/0031210 | A1 | 1/2009 | Backhouse |
| 2009/0129319 | A1 | 1/2009 | Buddhikot |
| 2009/0089797 | A1 | 4/2009 | Kukreja et al. |
| 2009/0292791 | A1 | 11/2009 | Livshits et al. |
| 2010/0042979 | A1 | 2/2010 | Nanja |
| 2010/0042981 | A1 | 2/2010 | Dreyer |
| 2011/0214016 | A1 | 9/2011 | Gschwind |
| 2012/0110435 | A1 | 5/2012 | Green |
| 2012/0272132 | A1* | 10/2012 | Mondal et al. ............... 715/234 |
| 2013/0061128 | A1 | 3/2013 | Lucco |
| 2013/0191439 | A1 | 7/2013 | Kern et al. |
| 2014/0281918 | A1 | 9/2014 | Wei et al. |
| 2015/0088969 | A1 | 3/2015 | Wei et al. |
| 2015/0100879 | A1 | 4/2015 | Nandagopal et al. |
| 2015/0312314 | A1 | 10/2015 | Liu et al. |
| 2018/0196644 | A1 | 7/2018 | Bhakar et al. |

FOREIGN PATENT DOCUMENTS

| | | |
|---|---|---|
| CN | 101263482 A | 9/2008 |
| CN | 101495982 A | 7/2009 |
| CN | 101706753 A | 5/2010 |
| JP | 2009211190 A | 9/2009 |
| WO | 2006085314 A2 | 8/2006 |
| WO | 2011087993 A1 | 7/2011 |

OTHER PUBLICATIONS

Giorgio Maone, noscript features, published Aug. 12, 2011, Waybackmachine, pp. 1-9 (pdf).*

Nvidia, The Benefits of Multiple CPU Cores in Mobile Devices, published 2010 as Whitepaper, Nvidia, pp. 1-23 (pdf).*

Georges et al., Java Performance Evaluation through Rigorous Replay Compilation, published 2008 ACM, pp. 1-19.*

Wikipedia, Self-modifying code, published Feb. 20, 2010, Wayback Machine, pp. 1-8 (pdf).*

B. McCollum, et al.; A Hyper-Heuristic Approach to Parallel Code Generation, Aug. 10, 2010.

The Java HotSpot Performance Engine: An In-Depth Look, Jun. 1999.

Chandrasekaran, Sunita, et al.; Compilation and Parallelization Techniques with Tool Support to Realize Sequence Alignment Algorithm on FPGA and Multicore, Aug. 10, 2010.

Ha, Jungwoo, A Concurrent Trace-baed Just-in-Time Compiler for Single-threaded JavaScript, Jun. 1999.

"International Search Report", dated Jan. 30, 2013, Application No. PCT/US2012/052414, Filed date: Aug. 26, 2012, pp. 11.

"Supplementary Search Report Received for European Patent Application No. 12828251.4", dated Jun. 11, 2015, 11 Pages.

"Notice of Allowance Issued in Japanese Patent Application No. 2014-528481", dated Nov. 1, 2016, 4 Pages.

"First Office Action and Search Report Issued in Chinese Patent Application No. 201210319613.2", dated Feb. 2, 2015, 12 Pages.

"Second Office Action Issued in Chinese Patent Application No. 201210319613.2", dated Aug. 31, 2015, 7 Pages.

"Supplementary Partial Search Report Received for European Patent Application No. 1282851.4", dated Jun. 11, 2015, 5 Pages.

"Office Action Issued in Chinese Patent Application No. 201510307296.6", dated Aug. 29, 2017, 10 Pages.

"Notice of Grant of Patent Right for Invention Issued in Chinese Patent Application No. 201510307296.6", dated Nov. 7, 2017, 4 Pages.

"Non Final Office Action Issued in U.S. Appl. No. 15/799,966", dated Jul. 27, 2018, 14 Pages.

"Final Office Action Issued in U.S. Appl. No. 15/404,130", dated Sep. 18, 2018, 50 Pages.

"Cut Your JavaScript Load Time 90% with Deferred Evaluation". Retrieved from: http://blog.sproutcore.com/cut-your-javascript-load-time-90-with-deferred-evaluation/, Dec. 6, 2011, 3 Pages.

"Find unused code [closed]", Retrieved From: http://stackoverflow.com/questions/245963/find-unused-code, Dec. 1, 2016, 3 Pages.

"Office Action issued in European Patent Application No. 12828251,4", dated Feb. 7, 2018, 4 Pages.

"Partial Supplementary Search Report issued in European Patent Application No. 12828251,4", dated Jan. 30, 2015, 5 Pages.

"Non-Final Office Action Issued in U.S. Appl. No. 15/404,130", dated May 17, 2018, 43 Pages.

Boissiere, Alexandrine, "Efficient Static Assets Pipeline with Webpack", In Proceedings of the ACM Applicative, Feb. 25, 2015, 1 Page.

Lee, et al., "Reducing Startup Latency in Web and Desktop Applications", In Proceedings of the 3rd Conference on USENIX Windows NT Symposium—vol. 3, Jul. 12, 1999. 11 Pages.

Livshits, et al , "Doloto: Code Splitting for Network-Bound Web 2.0 Applications", In Proceedings of the 16th ACM SIGSOFT International Symposium on Foundations of Software Engineering, Nov. 9, 2008, 25 Pages.

"International Search Report and Written Opinion Issued in PCT Application No. PCT/US2018/012439", dated Apr. 6, 2018, 13 Pages.

Zimmerman, Joe, "Lazy Loading JavaScript With RequireJS", Retrieved From: https://www.joezimjs.com/javascript/lazy-loading-javascript-with-requirejs/, Mar. 13, 2013, 13 Pages.

"Office Action Issued in Korean Patent Application No. 10-2014-7005629", dated Oct. 16, 2018, 10 Pages.

"Final Office Action Issued in U.S. Appl. No. 15/799,966", dated Feb. 8. 2019, 19 Pages.

"Non Final Office Action Issued in U.S. Appl. No. 15/404,130", dated Mar. 8, 2010, 48 Pages.

"Notice of Allowance Issued in U.S. Appl. No. 15/404,130", dated Jul. 10, 2019, 12 Pages.

* cited by examiner

FAST PRESENTATION OF MARKUP CONTENT HAVING SCRIPT CODE

TECHNICAL FIELD

The subject disclosure relates to fast presentation of markup content having script code by a variety of techniques for reducing conventional delays at various stages of code preparation associated with dynamically generating executable code based on the script code.

BACKGROUND

As the web browsing experience continues to evolve from a flat presentation of information with minimal interactivity to a richer application or applet experience with lots of interactivity at the client side, or more generally, a hybrid of information display and richer interactivity with objects on display, there are a variety of challenges based on evolving the old document object model (DOM) originally designed primarily for flat presentation of information based on native code on a client to an experience that fluidly handles script code, such as JavaScript objects. For instance, speeding the user experience up remains a challenge.

For instance, with fly out menus of the past, the web experience flickered with delays based on communications with the server. Script enables small programs to modify the DOM on the fly without returning to the server for additional help, e.g., Asynchronous JavaScript and extensible markup language (Ajax). As developers and consumers alike want to do more dynamically on the fly without returning to the server, making script code execute fast on the client side has become a challenge.

Since the user experience centers on scripting the DOM, changing the DOM slowly makes for poor interactive response. Communication between the scripting engines and the native classes of the DOM were poor in the past due to the use of OLE automation including a set of interfaces, iDispatch, iActiveScript, etc., which make any object scriptable. In addition, a variety of Component Object Model (COM) objects may be indiscriminately created today, but which may be unnecessary, slowing down performance.

Client-side scripting, which can make web pages more responsive to user input once on the client browser by avoiding one or more round trip communications with a server, generally refers to the class of computer programs on the web that are executed client-side, by the user's web browser, instead of server-side (on the web server). As an example, client side scripting is a part of dynamic hypertext markup language (dynamic HTML or DHTML), enabling web pages to be scripted, e.g., in scripting languages such as JavaScript (client-side JavaScript) and VBScript, to have different and changing content depending on user input, environmental conditions, such as the time of day, or other variables.

Client-side scripts that are embedded within a markup document are sometimes referred to as "embedded scripts", and scripts that are contained in separate files, which are referenced by the document(s) that use the file, are sometimes referred to as "external scripts". In response to a request, such script files are sent to the user's computer by network computing devices, such as web server(s), on which the files reside. In this regard, in order to execute the script and display the markup document including any visible output from the script, the web browser works with a script engine to parse and compile the script code. Client-side scripts may also contain instructions for the browser to follow in response to certain user actions, e.g., clicking a button. Often, these instructions can be followed without further communication with the server.

As a trend, web browsers and web pages are tending to employ more and more client-side scripting, accounting for an improved user interface in which the user does not experience unfriendly "refreshing" of a web page, but instead sees, for example, an icon representing an animated Graphic Interchange Format (GIF) file representing that the request for the GIF file occurred and that portion of the page will be updated shortly. Adding to JavaScript capabilities, Ajax allows client machines and developers of scripted documents to communicate with network computing devices, such as web server(s), in the background without requiring a new version of the page to be requested and rendered.

While generally leading to improvements in user experience, this leads to other latencies where setup time takes too long on the client side. For instance, where a heavy amount of scripting is employed in a web site as tends to be the case for the top 100 web properties, or where network data transfer rates are slow, or where processing on the client is otherwise limited, the script engine can take too long to deliver up all of the executable code for presentation of the content of the markup document leading to a poor user experience.

In this regard, conventional web browsing has evolved in a way that leads to inefficient creation of executable code by the script engine because there is no discrimination by the script engine regarding script code creation, leading to unwanted latencies while the script engine completes its work for presentation of the scripted markup document. Such unwanted latencies can create a significant drag on user experience, particularly where a user may not need or want to wait for all web site functionality to load before beginning an interaction.

The above-described deficiencies of today's script engines and code generation are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In an example embodiment, a method comprises receiving script code by a script engine of a computing device, the script code being included or referenced in a markup document received by a browser application of the computing device, and determining a level of effort to apply to at least one phase of a multi-phase code preparation process applied to the script code by the script engine. The level of effort can be determined based on a prediction or analysis of calling of a portion of the script code by the browser application or based on a pattern observed in historical usage of the portion of the script code by the browser application.

In another example embodiment, a computing device comprises a browser application configured to display a markup document including or referencing script code, and a script engine component configured to receive the script code, analyze a portion of the script code or usage of the portion during execution of the script code to determine a set of conditions under which a performance of the portion increases by execution of a modified portion, wherein, in response to the set of conditions being met, the modified portion is executed by the browser application instead of the portion.

In another example embodiment, a computer-readable storage medium comprises computer-readable instructions that, in response to execution, cause a computing device including at least two processing cores to perform operations, comprising processing a markup document including or referencing script code by a first processing core of the at least two processing cores including generating executable code by the first processing core that enables functionality represented by the script code of the markup document. The operations further comprise, based on a characteristic of the script code, selectively generating, by a second processing core of the at least two processing cores, alternative executable code different from the executable code and substituting the executable code with the alternative executable code for further execution by the first processing core of the script code.

The generating the alternative executable code can include selectively generating the alternative executable code based on a function of a ratio of size of at least one loop of the script size to overall size of the script code, a measurement of computational intensity of the script code or an analysis of a call tree constructed based on the script code.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
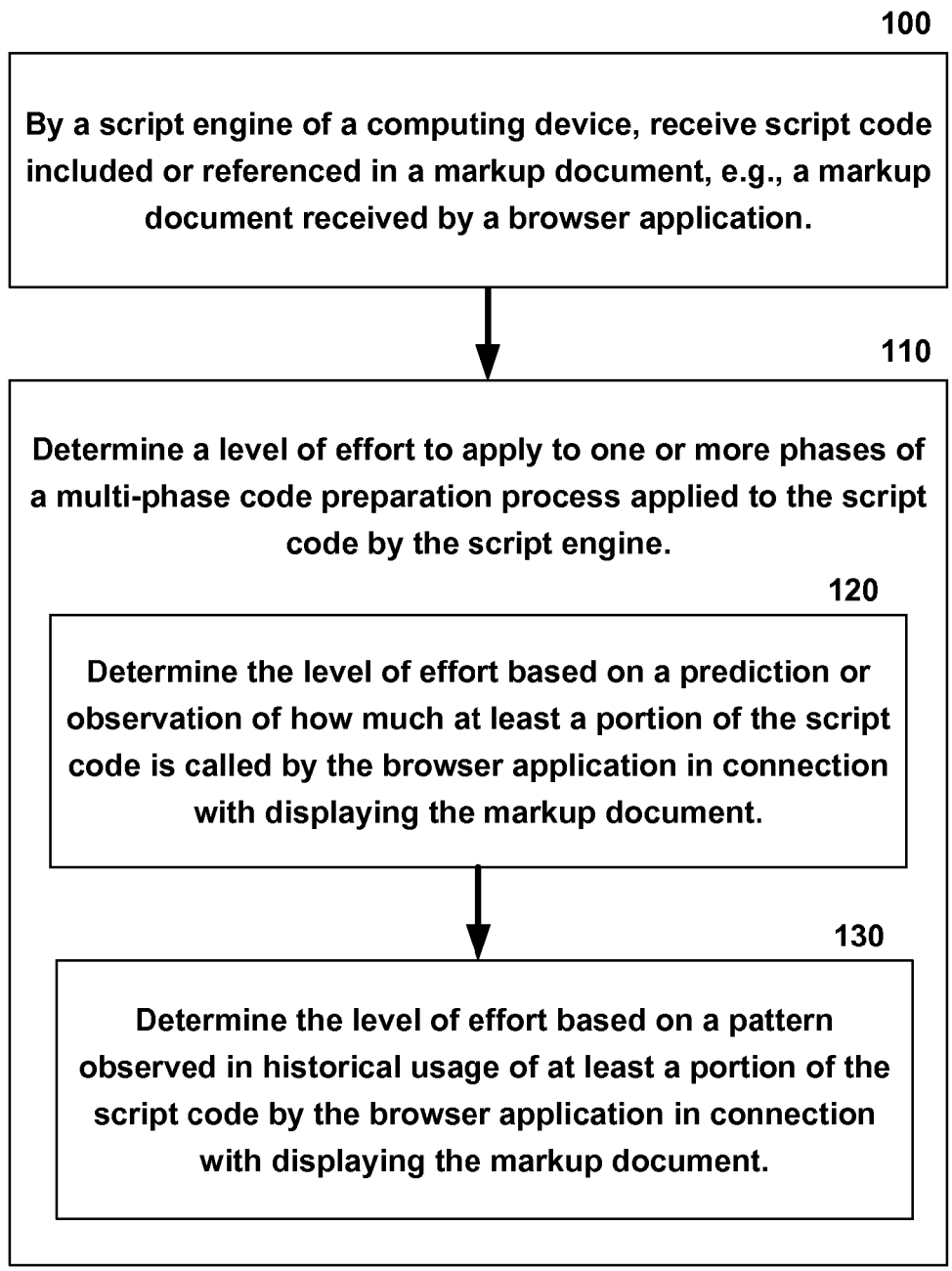
FIG. 1 illustrates a flow diagram illustrating an example method for determining a level of effort to apply to one or more phases of a multi-phase code preparation process.

As indicated in the background, the trend around the inclusion of more and more embedded or external scripted code, such as JavaScript, in markup documents, such as DHTML documents, can lead to some poor user experiences where undue delays occur as a result of conventional dynamic code generation processes applied by conventional script engines.

In this regard, dynamic code generation has some inherent challenges due to some of its characteristics. For instance, with dynamically typed languages, such as JavaScript, often it is not possible to tell, until the code actually executes, what type various items of data assume, e.g., one may not know whether a dynamically typed variable is an integer, a float, or a string until the code actually executes.

In addition, the broader context of how JavaScript is hosted leads to other differences since, for programs having a goal of being part of a web page, such as programs of CNN.com, the demands on dynamic compilation of programs to use native code instructions while concurrently running the programs can become significant. For example, one characteristic of the top 100 web sites is that they load a lot more code than they actually run. In this regard, the challenges are not simply trying to run code fast. Since some web sites ultimately only run about 15%-20% of the code they load for a given user or use, there is another challenge beyond simply executing code fast, due to there being other bottlenecks in the process, such as loading, parsing, etc. This is a different context than simply running Java fast, since a different goal is involved of minimizing loads and parsing, and reducing the amount of code preparation being done for code that is not used or unlikely to be used.

The term "hot spots" is a vernacular term for a function that is used a lot in a running program. However, the problems addressed herein in various embodiments herein are broader in that they also pertain to avoiding code preparation through the entire chain from receiving a markup page to presenting the web page and executing requested functionality, e.g., avoiding or deferring loading, avoiding or deferring parsing, avoiding or deferring compiling, avoiding or deferring optimization of executing code, etc. The subject disclosure thus relates to tailoring the preparation of script code referenced or received in presentation content, such as, but not limited to, script code referenced in markup content received from a network in response to a web page request, to enable display of the presentation content to a user with reduced delays associated with preparation.

Accordingly, in various embodiments presented in the subject application, code preparation is reduced, e.g., with a goal of preparing as little code as possible in order to present UI associated with a markup document as quickly as possible, and deferring loading, parsing, interpreting, etc. as much as possible, e.g., deferring the various code preparation stages or sub-stages for any items that interfere with presentation of a snappy UI, until the code is actually requested or certain conditions are met.

In addition, through observation of the code during interpretation or execution, if a common execution path case can be determined for the code, then, in various embodiments presented in more detail below, two versions of the native code can be maintained with one optimized or otherwise improved for the common case, where the other version is only used for the uncommon case. These concepts can be extended to more than two versions of the native code and associated use cases, where there are efficiencies in maintaining more than two use cases that are not outweighed by switching costs.

In still further embodiments presented in more detail below, multiple cores can be used in a way to prioritize the display of information in response to the information being ready by maintaining the UI thread for presenting the information on one core or set of cores, and performing jitting or applying the above-described optimization and management of code preparation processes on another core or set of cores. In this regard, data structures such as work queues can be maintained for sharing information between optimization and management core generating modified native code, and the UI core that is running the display of the web site to the user as quickly as possible. Further, in various embodiments, the UI core is provided with notice that an alternative piece of code is available to run for a given circumstance, so that the alternative piece of code can be swapped in for execution by the UI core, but without interference of currently executing code by the UI core.

Other embodiments and various non-limiting examples, scenarios and implementations are described in more detail below.

Deferred and Optimized Code Preparation of Script Code for Fast Presentation of Content As mentioned, in various embodiments presented herein, code preparation is reduced or deferred, e.g., with a non-limiting goal of preparing as little code as possible in order to present UI associated with a markup document as quickly as possible, and deferring loading, parsing, interpreting, optimizing, etc. as much as possible, e.g., deferring until later or actually requested, the various code preparation stages or sub-stages for any items that interfere with presentation of a snappy UI.

FIG. 1 illustrates a flow diagram illustrating an example method for determining a level of effort to apply to one or more phases of a multi-phase code preparation process, e.g., no effort, partially parse only, parse, interpret, monitor execution of the code to optimize the code, etc. At 100, script code is received by a script engine of a computing device, the script code being included or referenced in a markup document received by a browser application of the computing device. At 110, a level of effort is determined to apply to at least one phase of a multi-phase code preparation process applied to the script code by the script engine. The determination of the level of effort can include, at 120, determining the level of effort based on a prediction or observation of how much at least a portion of the script code is called by the browser application in connection with displaying the markup document or, at 130, determining the level of effort based on a pattern observed in historical usage of a portion of the script code by the browser application in connection with displaying the markup document, or performing both 120 and 130.

Figure 2:
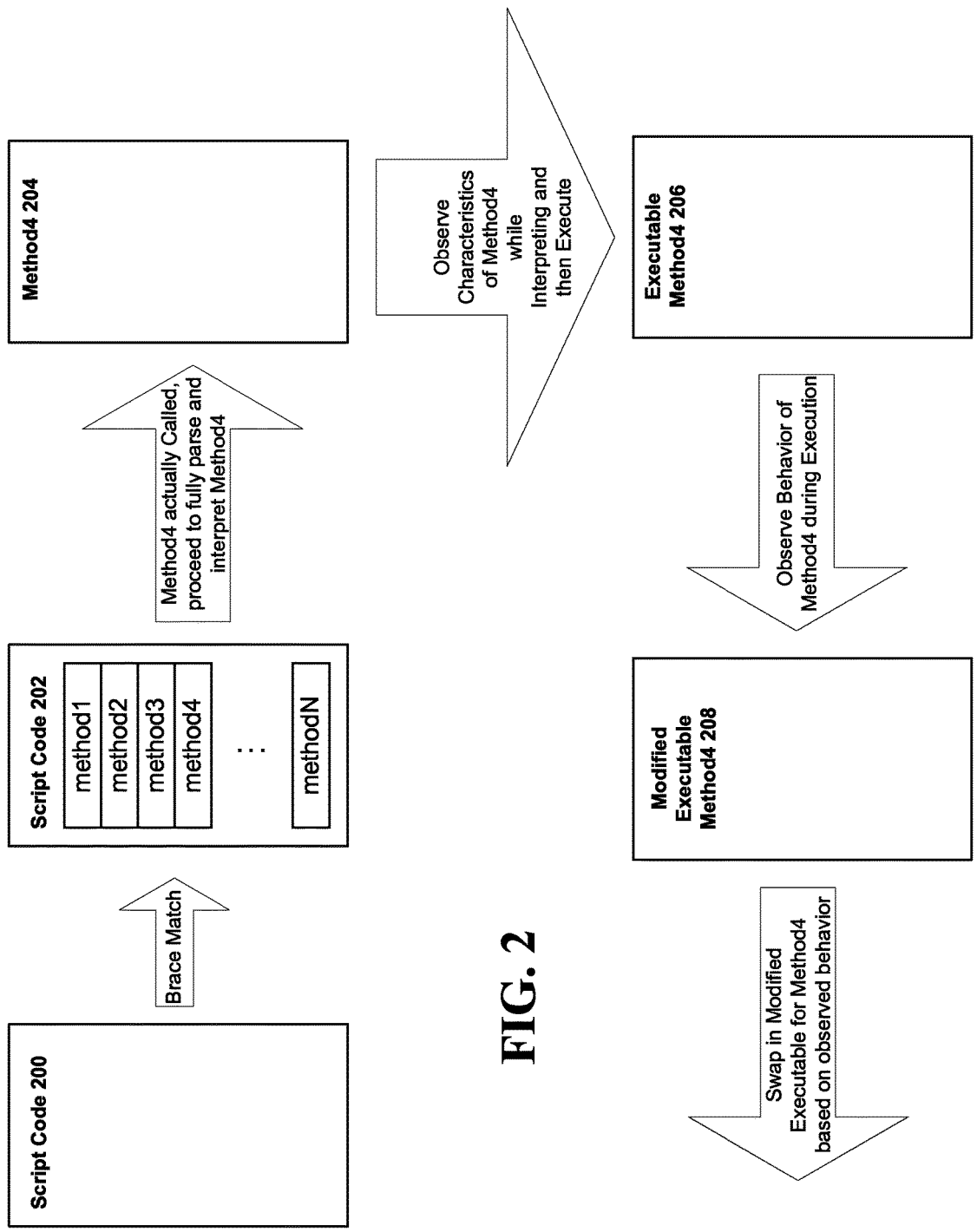
FIG. 2 illustrates various example stages that code can undergo during code preparation according to various embodiments.

For instance, as illustrated in FIG. 2, as an initial stage after receiving the code, instead of fully parsing the code, optionally less effort can be applied. For instance, no parsing can be performed, or partial parsing can be performed by merely determining the beginning and end of functions, e.g., with brace matching. For example, with brace matching, the script engine may receive code 200 and determine where the boundaries of N functions Method1, Method2, Method3, Method4, . . . , MethodN are in partially parsed code 202, until a function is found that is called by the browser application. For instance, if Method4 of code 202 is actually called, then the script engine can start parsing and interpreting Method4 resulting in parsed and interpreted Method4 204, having merely determined the beginning and ending of Method1, Method2, and Method3. Parsing and interpreting are thus examples of code preparation stages, where such a level of effort can be determined and applied in order to treat higher priority code with more resources, and lower priority code with fewer or no resources, as a particular determination of level of effort may indicate.

During interpretation, the script engine can also observe characteristics of Method4, to improve the executable code generated to perform Method4, e.g., by improving memory usage of Method4, or otherwise making Method4 more efficient. For instance, the script engine might determine that there is a loop in Method4 that runs a lot, and apply more optimization resources to that loop, or the script engine might determine that the type of a certain variable is predictably or deterministically an integer for a piece of code, in which case a more efficient representation can be used. In this regard, while dynamic programs can have variables that take on different types at run-time, programmers nonetheless tend to develop code with patterns for simplicity of design or representation, where, e.g., a programmer will consistently use a variable to store an integer, or instead another variable that is predictably or deterministically a string. In this regard, during interpretation, the script engine can observe such patterns, and then simplify the code preparation for generation/compilation of the executable code 206 for Method4.

As yet an additional operation, as will be described in more detail below in other embodiments, the behavior of executable code 206 can be observed during execution of the code too, in which case, further observations can be made about the way the code runs in the typical case, allowing for further modifications to be made to the executable code 206 in the form of modified executable code 208, which can then replace executable code 206 for future executions, or some of the future executions. Accordingly, in various embodiments, at any of multiple phases of code preparation, e.g., parsing, interpreting, compiling, execution, or sub-phases of any phase, since each of these activities can be divided up into a variety of code preparation steps to which a level of effort can be applied, a level of effort can be determined, and if the level of effort does not demand immediate resources, the associated code preparations phases or sub-phases can be deferred, in effect allocating the immediate resources to code preparation that is actually requested by the browser application, or likely to be actually requested by the browser application a lot or in the near future.

Accordingly, in one aspect, code preparation is deferred throughout and wherever possible for the various stages and sub-stages of code preparation. This is not simply just deferring conversion of script code to native processor code, but is more broadly applicable in that the various embodiments described herein defer parsing, interpreting, generation of bytecodes, etc., i.e., any stage or sub-stage of code preparation based on an associated level of effort to be applied for a given piece of code.

As mentioned, the presently described embodiments are broader than the typical vernacular use of term 'hot spots', which observes hot functions (e.g., functions that run a lot), and puts more effort into preparing the hot functions at run time than cold functions. These embodiments may consider any number N of phases of preparing code, and a level of effort can be determined for each phase based on predicted and observed use of the code. In addition, there can be multiple sub-levels of a given phase to which different levels of effort can be applied.

Figure 3:
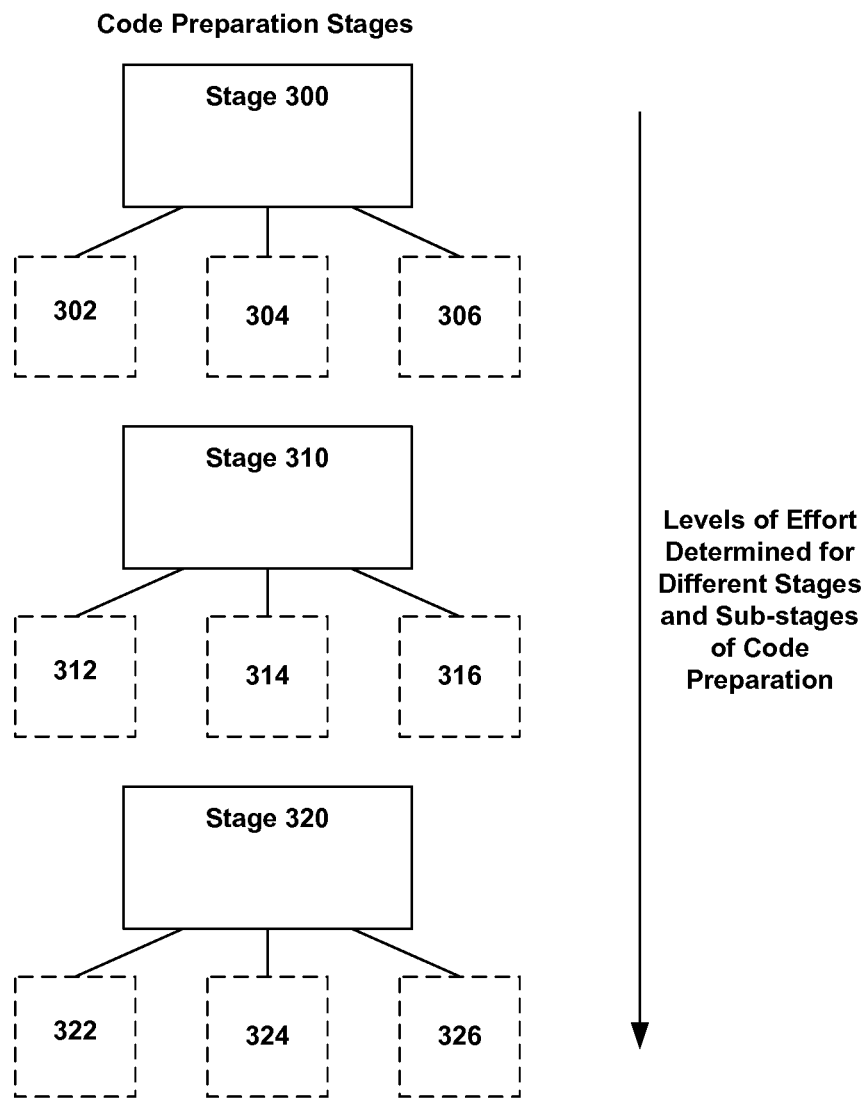
FIG. 3 is a block diagram illustrating that there can be multiple sub-levels of a given phase to which different levels of effort can be applied according to various embodiments.

This is illustrated in the block diagram of FIG. 3 illustrating three stages 300, 310 and 320 of code preparation, respectively having sets of sub-stages 302, 304 and 306, 312, 314 and 316, and 322, 324 and 326. In this regard, different levels of effort can be assigned to the different stages and/or sub-stages, e.g., based on predicted code use, or observation of actual code use. For instance, example optimization techniques at the sub-stage level for a code optimization stage, such as stages 300, 310 or 320, may include loop invariant code motion analysis, common self expression elimination, constant propagation, etc.

While three stages are illustrated with three sub-stages each in FIG. 3, it is noted any number of stages and sub-stages are considered for alternative embodiments, and according to any hierarchical relationship, or according to any other arbitrary or optional code preparation processes to which a level of effort can be assigned to a given branch or node of the code preparation process. For instance, as another non-limiting example, a script engine could decide to run three phases of ten total phases on "warm" code, run only one phase of the ten on "cold" code, but run all ten phases on a subset of the hottest code. In other words, for any number of phases of a code preparation process, the level of effort can be adjusted or tuned at emitting the most effective sequence of native machine instructions as a function of time based on how much the code is being used by the running program, and information about the code and its usage.

Accordingly, in addition to deferral of code preparation phases or sub-phases, various embodiments herein describe generating alternative code over time as resources become available or committed to optimizing a given set of code or functions, based on predictive or actual observations about execution of the code. As an example, the average user experience with a high use web site, such as the New York Times' online site, may be about 5-10 minutes, but it only takes a fraction of time from the user's standpoint for the script engine to observe most of the core functions of the New York Times, e.g., how to lay out pages, fetch style information, fetch data, etc. In this regard, there are not hundreds of ways to lay out a news page, and so, relatively quickly, the script engine can completely or mostly observe what the common code pass(es) are for reading an article on the New York Times, and then start generating alternative code for reading the same or further articles.

Figure 4:
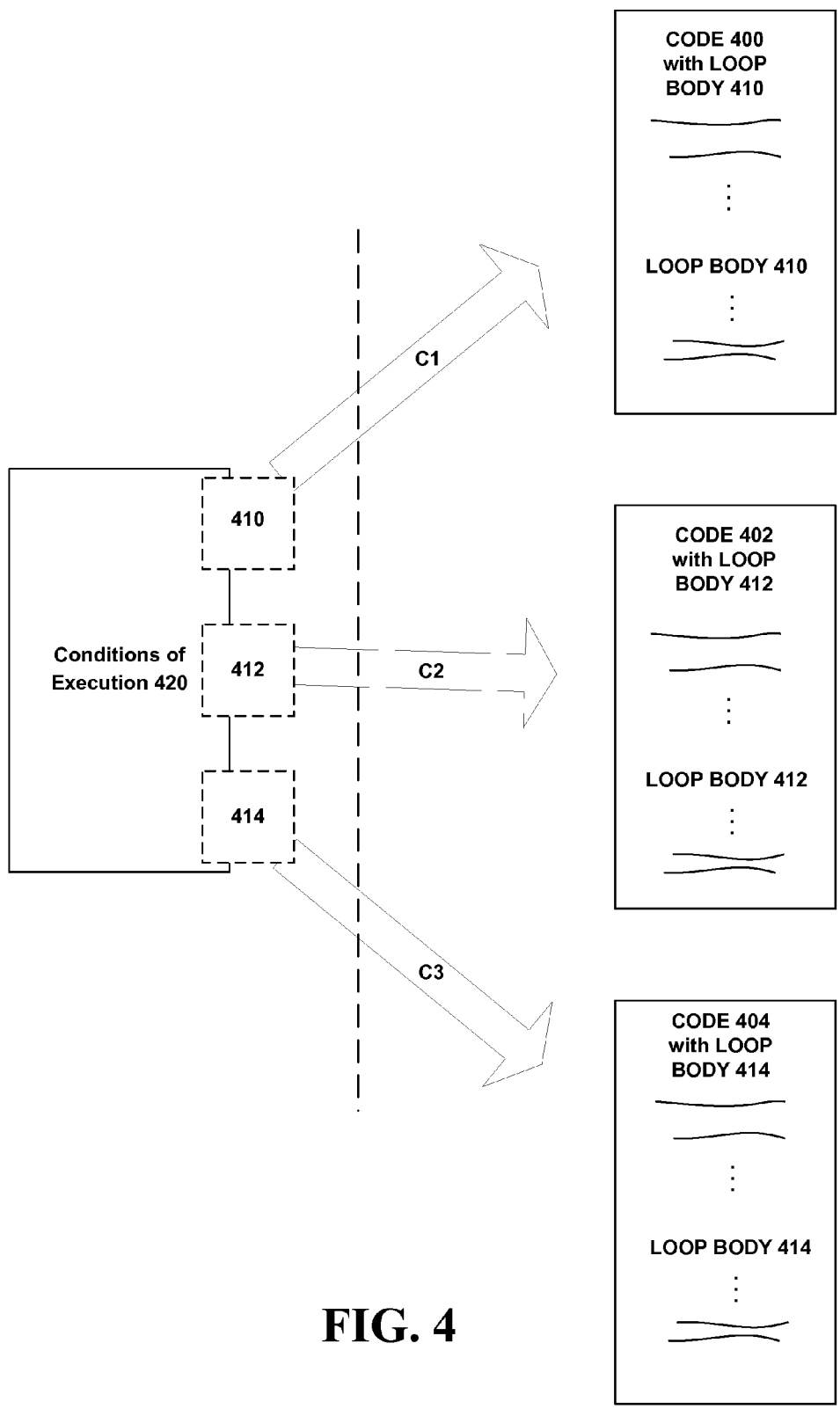
FIG. 4 is a block diagram illustrating generation of alternative loop bodies for code based on differing conditions of execution in an embodiment.

FIG. 4 is a block diagram illustrating the generation of alternative loop bodies for code based on differing conditions of execution. For instance, depending on the conditions of execution 420, loop body 410, loop body 412 or loop body 414 might be fastest or otherwise more efficient for application to the current conditions. Accordingly, executable code 400 with loop body 410, executable code 402 with loop body 412, and executable code 404 with loop body 414 can each be generated in advance, or the loop bodies 410, 412 or 414 can be swapped in or out of existing code addressed by the presentation thread to execute the alternative bodies for the appropriate conditions C1, C2 or C3 respectively. Thus, for any predefined set conditions A, B, C, etc. that alone or in combination result in conditions C1, C2 or C3, different loop bodies can be swapped in as a result in an effort to improve the efficiency of execution of code. In this example, loop body execution is optimized across alternatives, however, the presently described embodiments are applicable to other ways of optimizing, or swapping in or out code or portions of code other than loop bodies.

As a further non-limiting example of generation of alternative code, if it can be determined, as a result of predicting usage of code or actually observing execution of code, that over 95% of the time, an integer will be or is stored for a given item of data, then optimized native code can be generated that, e.g., uses the native integer register format for direct use with an x86 processor, and thus, for such scenario that occurs most of the time, the optimized native code can be used. And then, when the uncommon case occurs less than 5% of the time, the variable can be typed as a float (or something less efficient than the native integer register format) with another version of the native code, which can be swapped in for the special case.

Figure 5:
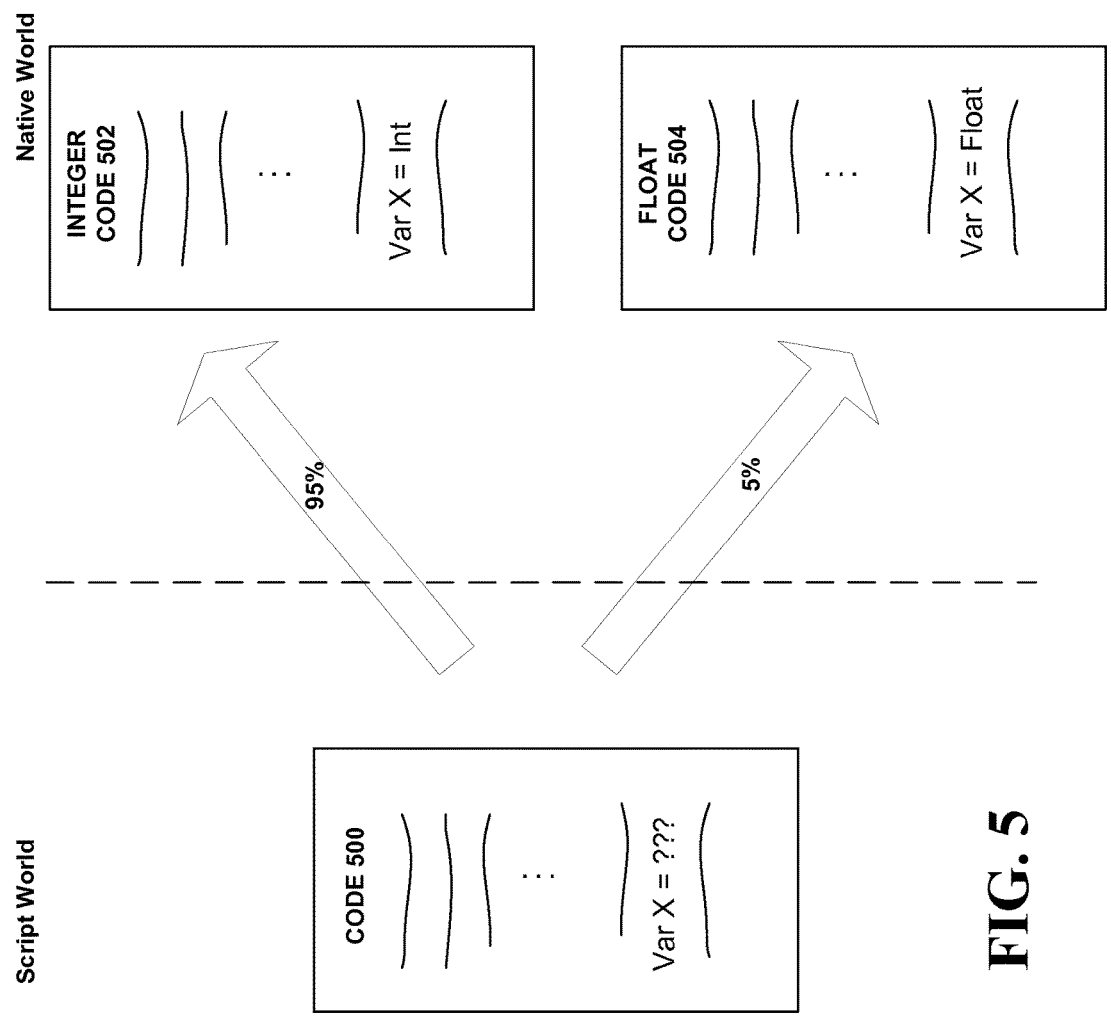
FIG. 5 illustrates another non-limiting example of code swapping during dynamic code generation and execution based on dynamic typing in an embodiment.

FIG. 5 illustrates another non-limiting example of code swapping during dynamic code generation and execution based on dynamic typing. In this regard, where it can be determined, e.g., by observing a characteristic of code 500 during interpretation or as a result of observing the code 500 during execution, that there is a common code path or set of paths, then native code 502 or other alternatives can be generated that are suited for the common code path(s), and then code 504 can be swapped in for the less common case when or if the less common case is encountered in fact. Such aspects around swapping in different versions of native code optimized to apply to different use cases of the native code are also described in more detail below. For example, in other embodiments described in more detail below, heuristics are applied to a decision of whether to apply a just in time compiler to a piece of code, and then execute the "jitted" code, or to simply interpret the piece of code under a given set of circumstances for the piece of code.

In this regard, FIGS. 4 and 5 illustrate another aspect of various embodiments described herein in that the code generation process is not only guided by deferral of code preparation stages and sub-stages, but also informed by various information levels possessed concerning the code itself, either through interpretation or observation of execution, to not only generate alternative code if alternative code can simply replace code in all instances, but also to generate alternative code for alternative situations (e.g., generating different loop bodies that can thereafter be readily swapped in or out depending on a given function call by the browser application).

Accordingly, as described above, the behavior of the code can be inferred or observed, leading to the generation of different code for different circumstances, e.g., a common case v. uncommon case, and perform alternative for the common case and thus improve overall performance without the constraints of the case of the lowest common denominator. Thus, intelligent choices for code generation can be informed by information about the code, e.g., that the code predictably or deterministically appears to define a variable as an array of integers, in which case code can be generated that performs a fast check at the top of the loop confirming it is an array of integers, and assuming so, using a more efficient loop tailored to the array of integers construct.

Figure 6:
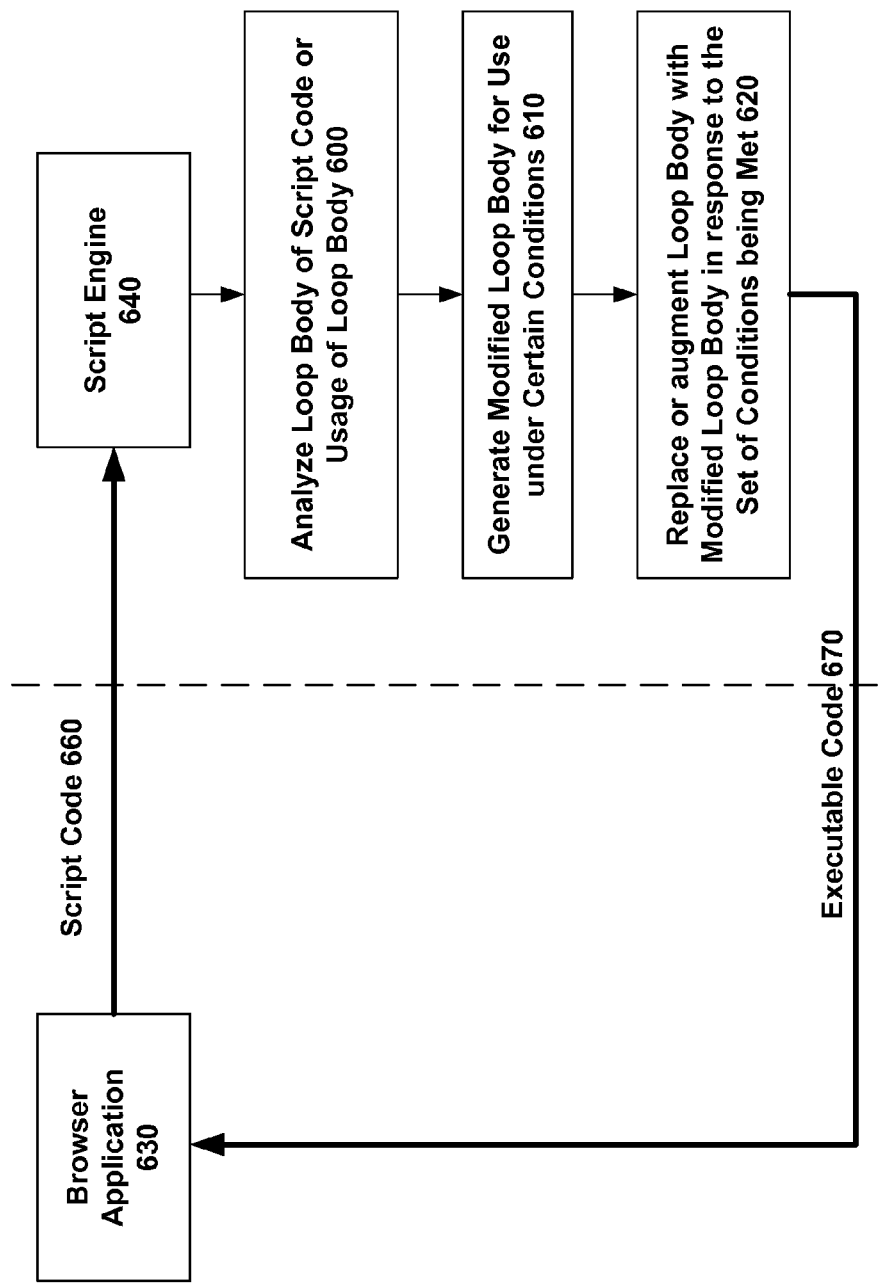
FIG. 6 is a flow diagram illustrating an example exchange between a browser application and a script engine in an embodiment.

FIG. 6 is a flow diagram illustrating an example exchange between a browser application 630 and a script engine 640. Script code 660 received by browser application 630 is sent to the script engine 640 without any priority information about the importance of script code 660. At 600, the script engine 640 analyzes a loop body of the script code 660 or a usage of the loop body. At 610, a modified loop body can be generated for use under certain conditions, e.g., optimized code for a common use case of the script code 660. At 620, the loop body can be replaced with the modified loop body in response to the set of conditions being met, or alternatively, a check can be made at a top of the loop body to confirm if the common use case is met, and as a result execute either the loop body or the modified loop body. Corresponding executable code 670 is returned to the browser application 630 for execution.

In this regard, application of the above techniques for directing the limited code generation resources of a script engine with a goal of presenting information to a user fast without waiting for lower priority code to be parsed, generated, optimized, etc. is further described with reference to the following non-limiting example.

At first, a markup file, such as HTML or DTHML, is received by a browser application, having stylesheets, JavaScript files, etc. The browser application proceeds to separate the different parts of the markup file, and then download the JavaScript or other files defined in the markup with concurrent connections, one for the various different pieces. As the various different pieces are received, the browser application forwards the JavaScript files to the JavaScript engine, but without any information about the priority or importance of any given piece. As a matter of timing, the script engine might also be ordered to get ready to run a given piece of code. However, the request to run the given piece of code might happen within only 1 ms of having received it by the browser application, yet if it takes 30-40 ms to generate the corresponding code, and another 5 ms in the UI path to be displayed, etc., these delays can add up and potentially affect the user experience. Accordingly, as noted above, it is beneficial if intelligence can be applied to deferral or avoidance of code preparation stages or substages. For example, as a matter of human visual and cognitive appreciation, a delay of 100 ms or more becomes a noticeable delay.

Accordingly, as another example, for a given piece of code, the script engine can instead spend 1-2 ms seeing where the function boundaries are, but not yet begin any parsing, and the script engine can insert a "parse me later" stub into the code, and pass it back after only 1-2 ms pass. Then, later, if the browser application wants to call, for example, a function F of the piece of code, another 1-2 ms can be spent parsing and running function F of the piece of code, while still avoiding parsing the entire piece of code.

According to other embodiments described above, the example can be taken further whereby the script engine can observe, while parsing and generating code for function F of the piece of code, that variable V appears as if it will predictably or deterministically be an integer, or after running F a few times, it can be confirmed that V is predictably or deterministically an integer, then the script engine can generate code specialized to the representation of V as an integer. In this regard, the script engine endeavors to respond as late as possible to what is demanded, while speculatively observing what has happened so far, further to an evolution toward creating faster and more efficient code that happens in the common case(s).

In other aspects of the subject disclosure, multiple cores are used to achieve a balance between the above-described management and optimization of code generation on the one hand, and quickly presenting UI to the user without waiting for the management and optimization to complete on the other hand. Accordingly, in various embodiments, the optimization and management takes place on a different thread than the main UI thread (which responds to input such as mouse clicks, etc. and immediately runs associated code, e.g., changing the view in response to the input accordingly), but other processing cores can concurrently be generating alternative code based on any of the above-described intelligent code generation embodiments.

In this regard, in various embodiments, a balancing process is applied between a UI core driving the rendering of the markup document and the optimizing/managing core that optimizes generation of code. In one embodiment, the optimizing/managing core manages data structures for sharing information between the optimizing/managing core generating alternative native code, and the UI core that is rendering the web site to the user. Since the UI core is focusing on fast presentation and is thus generally user facing, in an embodiment, the UI core and optimizing/managing core include a shared mechanism so that the UI core runs the alternative or optimized version of a given piece of code as it becomes available, but without waiting, i.e., to swap the alternative code into the activity of showing the web page without slowing down that activity. In this regard, as described in various embodiments below, a mechanism can be provided that avoids any problems associated with overwriting code with alternative code during execution of that code.

As described in one embodiment, an asymmetric design to the balancing process ensures that the optimizing/managing core handles the burden of maintenance of the work queues, coordination of swapping code in and out, generation of code in the background so that the UI core never waits and can continue on with its task of displaying information to the user.

In one non-limiting implementation, by calling into or checking a function called function_info, which is implemented per function, the UI thread can check if there is a native entry point to call, and if so, the UI thread calls to the native entry point. The native entry point can be a stub to a piece of code at a variety of phases of code generation, e.g., the native entry point might be a "generated code" stub, or a "parse me" stub that leads to the parsing of the code, or a "call the interpreter to run the code" stub. In this regard, the UI thread is agnostic to the content of the stub and simply proceeds to run what is there at the time, and according to the stub call. When alternative code can be produced, then the next time the UI thread passes over the code, the alternative code will have replaced the older code by virtue of the stub check, i.e., the next pass will cause the UI thread to jump to the alternative code via a "generated code" stub pointing to a new address.

For example, as part of progressively moving code towards generated code, in one embodiment, on an initial pass, unimportant code is not parsed, but a "parse me" stub is inserted so that on the next pass or when the code is next encountered by the UI thread, the code is parsed. Then the next time the code is called, bytecodes are generated, then the interpreter is called to run the bytecodes, and so on. The UI core may also drop off a work item with a lock free queue, which is a way to line work items up without taking locks. In this regard, the heuristics of how these queues are organized, priorities about when you do what to code, how much effort you put to parsing, compiling, etc. and why, are described in more detail below. Accordingly, a lot of work is happening in the background without knowledge by the user that is recognizing common web page and application scenarios, and directing the resources of the background core (optimizing/managing core) to where they will be most effective.

Figure 7:
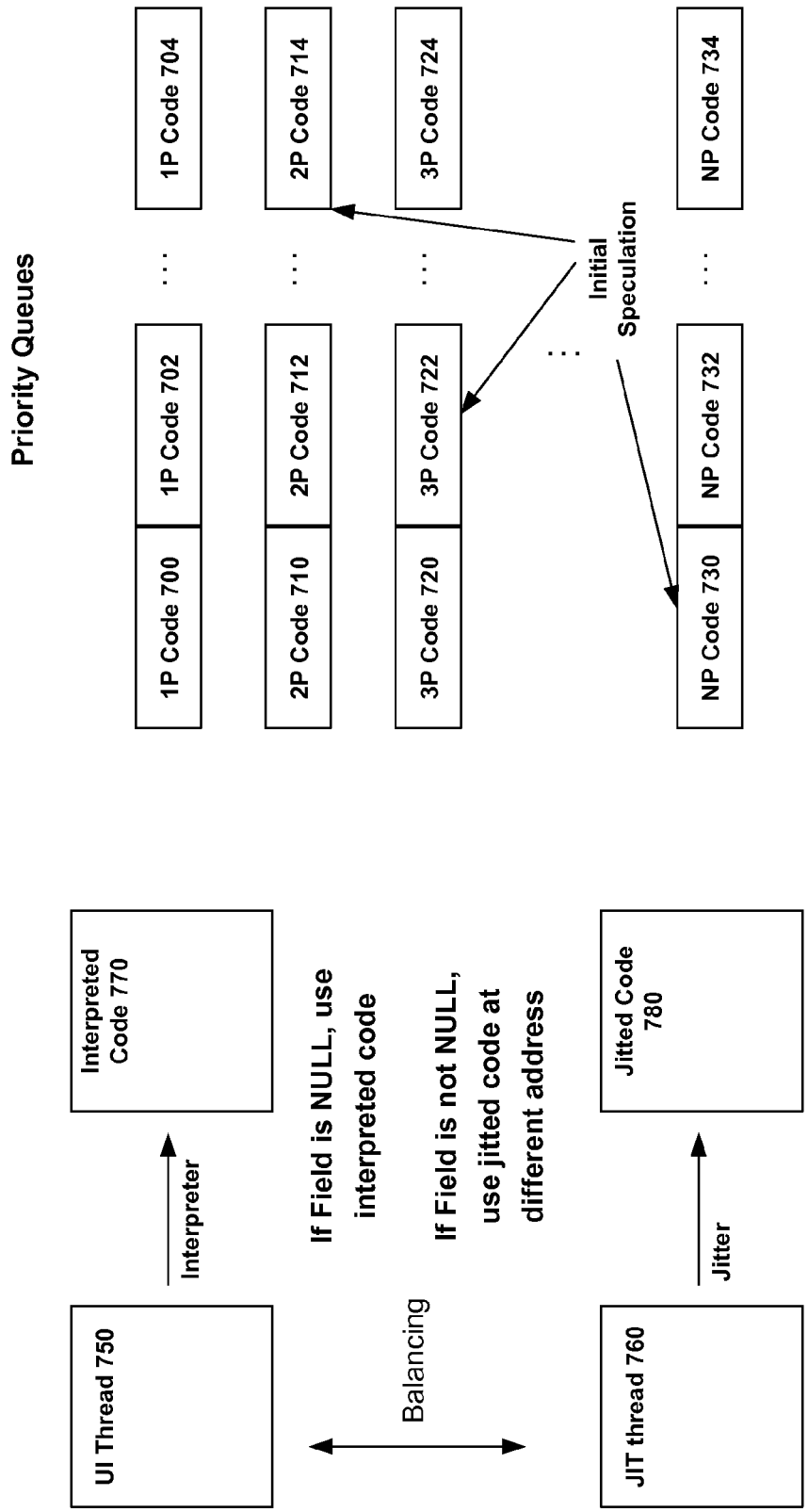
FIG. 7 is a block diagram illustrating a balance between a thread running interpreted code and a thread generating optimized code and a corresponding set of data structures in an embodiment.

FIG. 7 illustrates an example implementation in which a UI thread 750 handled by a first core, or set of cores, and a JIT thread 760 handled by a second core, or another set of cores achieve the above-described balancing with respect to when to run interpreted code 770 interpreted by an interpreter, or when to "jit" the code (pass the code through a JIT compiler) and then run the jitted code 780.

As an example of use of a stub, such as a thunk, as alluded to above, in this case, initially, each thunk can be assigned a NULL value, and if the value is NULL, the UI thread 700 can proceed to use interpreted code 770, however, if the field is not NULL (i.e., if there is an address that points to jitted code), then the UI thread 700 will instead us the jitted code 780. In the meantime, the optimizer/manager core continues to try to jit more and more code as resources and time allow so that eventually, all the work is done, but in the meantime, the user has experienced the web page as quickly as possible even if not all code has yet been loaded, parsed, compiled, jitted, etc.

Describing this example in more non-limiting detail, there are two ways to run code in such an environment: code can be run through an interpreter (generally faster), or the code can be "jitted" (run through a Just in Time compiler called a jitter, which is generally slower). Interpreting a linear sequence of code with an interpreter is faster, as a general matter, than jitting the code, waiting for completion of the jitter and then running the jitted code. In this regard, a jitter tends to take multiple passes over the code to form optimized code. Accordingly, if it appears that the code will be used a lot, it is generally a performance improvement to use the jitter notwithstanding the extra code preparation time, but if usage of the code will be low, e.g., once, it is generally a performance improvement to use the interpreter to run the code fast. Thus, in various embodiments, a balance is maintained between jitted code and interpreted code.

Initially, on the UI thread, the interpreter starts to interpret code, and on the JIT thread, candidates for jitting are identified. For example, the functions that are perform well for jitting are small functions where most of the code is in loop(s). Thus, these functions are jitted first according to a round speculative jitting, where the top candidates are selected based on a set of heuristics. With speculative jitting, not only are the functions that are called jitted, but some functions are jitted even though they are not called because of the likelihood they will be called. Then, once such functions are jitted, the entry point is switched from the interpreted code 770 to be the jitted code 780.

In this regard, a plurality of queues of differing priority are maintained by the background (optimizer/manager) core. An example of this is shown in FIG. 7 in which a top priority queue with work load slots 700, 702, . . . , 704 are maintained, a second level priority queue with work load slots 710, 712, . . . , 714, a third level priority queue with work load slots 720, 722, . . . , 724, . . . , and an Nth priority level queue with work load slots 730, 734, . . . , 736. For example, in one embodiment, 7 different priority queues are selected from high to low priority. During the initial pass, work is slotted according to characteristics of the code as it is received, however, during the initial pass, speculative jitting might operate to designate work on lower priority queues if it meets certain speculative criteria, described below. After the speculative jitting, for instance, work items 714, 722 and 730 might be good candidates for jitting, and thus jitting proceeds for the top level candidates of work load slots 700, 702, . . . , 704 and for those candidates selected during the speculative process.

Figure 8:
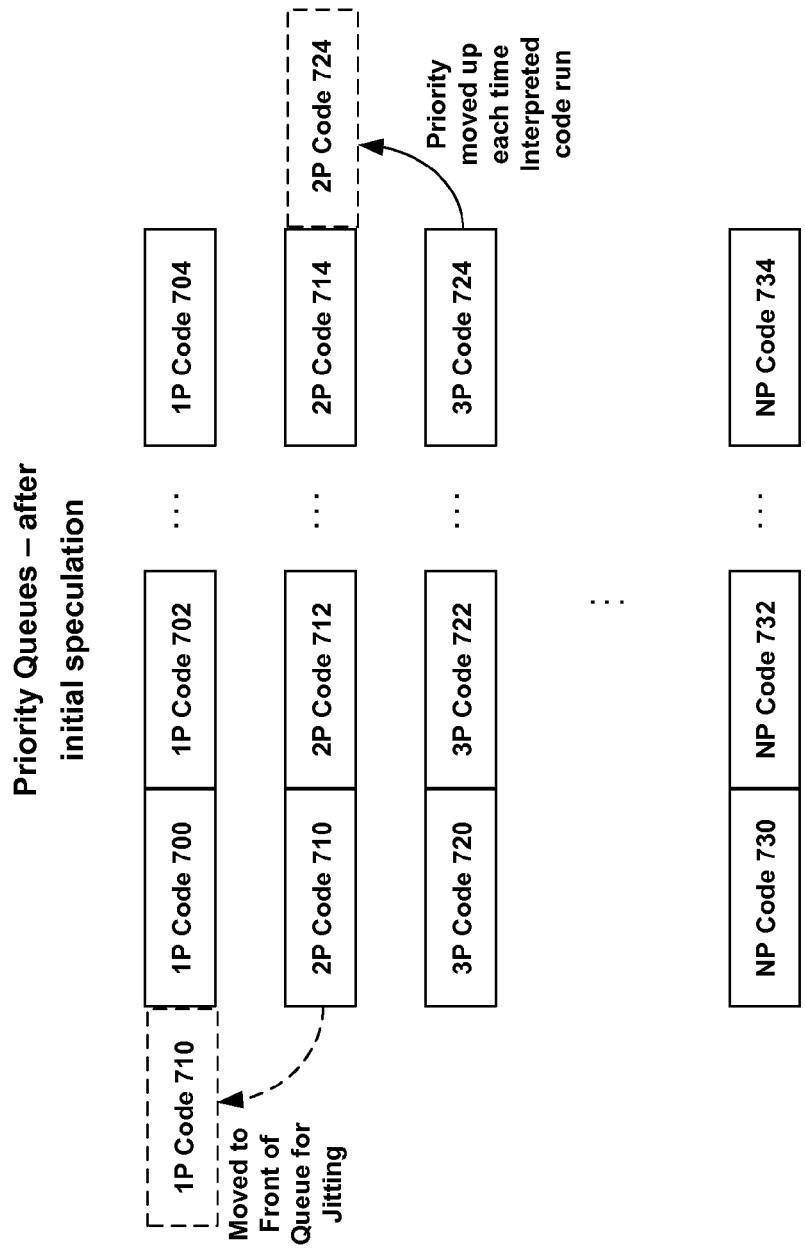
FIG. 8 is a block diagram illustrating a re-prioritizing of work items for code optimization in accordance with an embodiment.

After the speculative jitting round, further jitting starts with the highest priority ones, while the remainder of the items are percolated up in priority as follows. In this regard, as shown in FIG. 8 for code work item 724 in the third priority code, each time the code is run, it is moved up a level in priority every time the interpreted code 770 is called. Thus, after the initial pass, every time the interpreted code 770 is used, its priority moves up until it makes it to the top priority. In one implementation, when second priority code makes it to the top priority as illustrated by work item 710, it is actually moved in front of all other work, and the jitter begins its pass over such code at the next opportunity.

As a result, if code is used a lot, but of low initial priority and missed by the speculative round, it will percolate up and become optimized in short order. If the code is not called a lot, it will not be optimized as fast. Once all the top priority items are jitted, the jitter can begin to optimize the second priority items, and so on, until all work items are consumed and the UI thread is running the most optimal code without slowing down in the meantime.

With regard to heuristics of how to prioritize the generation of code for script items, one heuristic is how loopy the code is, which is a measurement of the code size excluding everything that is a loop, that is a ratio of overall code size to how much of it is a loop, or inversely, a ratio of the loops to code size. Thus, if a function is mostly loops, it is of higher priority for optimization than a function with small loops, but most of the code is not loops.

In addition, code that is doing heavy mathematical computation obtains more benefit from being jitted than code that does not. Optimization works well on code performing a lot of mathematics, since the processor's native registers can be taken advantage of, which are very fast compared to code that sets up separate memory structures in other memory.

In another non-limiting embodiment, a call tree is built of the script running, which helps to inform a priority order. In this regard, the call tree helps to anticipate what functions are going to be hot. For instance, if it is noted that a first piece of code will predictably or deterministically run before a second piece of code, then it makes sense to prioritize the first piece over the second piece. Or, for instance, if there is a global function without if statements, there is a high chance of executing such code in which case it is of higher priority. As a hypothetical example of a bit of code containing a function Foo:

```
Foo
{
    Bar;
    If X, then Y
}
```

It is clear in this case that Bar will be called if Foo is called, whereas since X may not be the case, Y may not be called, and thus Bar is a higher priority for optimization than Y. There are many different ways to take these heuristics as input and form relative priorities. One way is to assign a priority value from 0 to 100 depending on how much a given piece of code meets the selected set of heuristics, and then divided into the number of queues approximately equally.

As mentioned, once the jitted executable code becomes available, the address for the jitted executable code is inserted over the interpreter code thunk. If the interpreter code thunk is still around, then a check is made to determine if code generation has been done or is being done, and if not, the work item is bumped up in priority. If it has been jitted, then the thunk is replaced with jitted address. In other words, the thunk exists to help identify the case of using interpreted code, until the jitted code becomes available and then the thunk disappears/is replaced with the new memory location so that the code operates to jump to the different memory location to run the jitted code, e.g., forwarding or jumping the UI thread to the new code. In one embodiment, a short lock can be taken when moving work items to the front of the top priority queue to prevent a conflict, but since it is simply a re-positioning of items in a list, it is a very fast and minimal lock time.

As described above, 2 cores are used, 1 for the interpreter and 1 for the jitter, however, in an additional embodiment, there can be 3 or more cores: 1 for the interpreter, 1 for a fast jitter (less thorough), and 1 for a slow jitter (thorough). In this way, for certain items that would benefit from some, but not complete, optimization, such items would be improved as an intermediate step.

In addition, a supplemental core can be used to perform all the garbage collection for all the objects that are no longer used or referenced by any other object in connection with display of the web site, so as to not interfere with the important work being done by the other cores.

Figure 9:
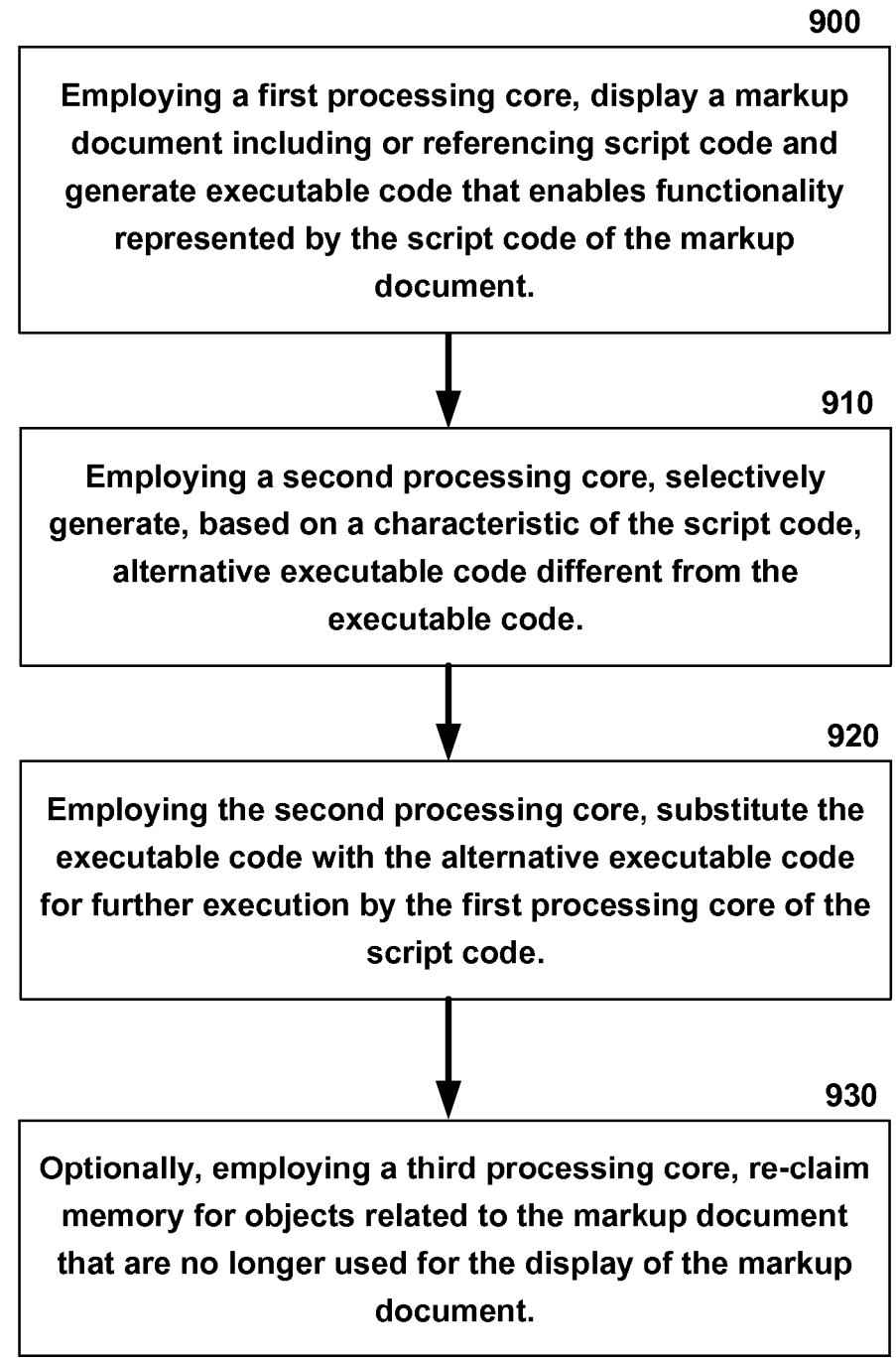
FIG. 9 is a flow diagram illustrating a non-limiting process for generating optimized code for substitution in an embodiment.

FIG. 9 is a flow diagram illustrating a non-limiting process for generating optimized code for substitution in an embodiment. At 900, employing a first processing core, a markup document including or referencing script code is displayed and executable code is generated that enables functionality represented by the script code of the markup document. At 910, employing a second processing core, based on a characteristic of the script code, alternative executable code is selectively generated that is different from the executable code. At 920, employing the second processing core, the executable code is substituted with the alternative executable code for further execution by the first processing core of the script code. Optionally, at 930, a third processing core can perform processes of garbage collection that re-claim memory for objects related to the markup document that are no longer used for the markup document or its functionality.

Figure 10:
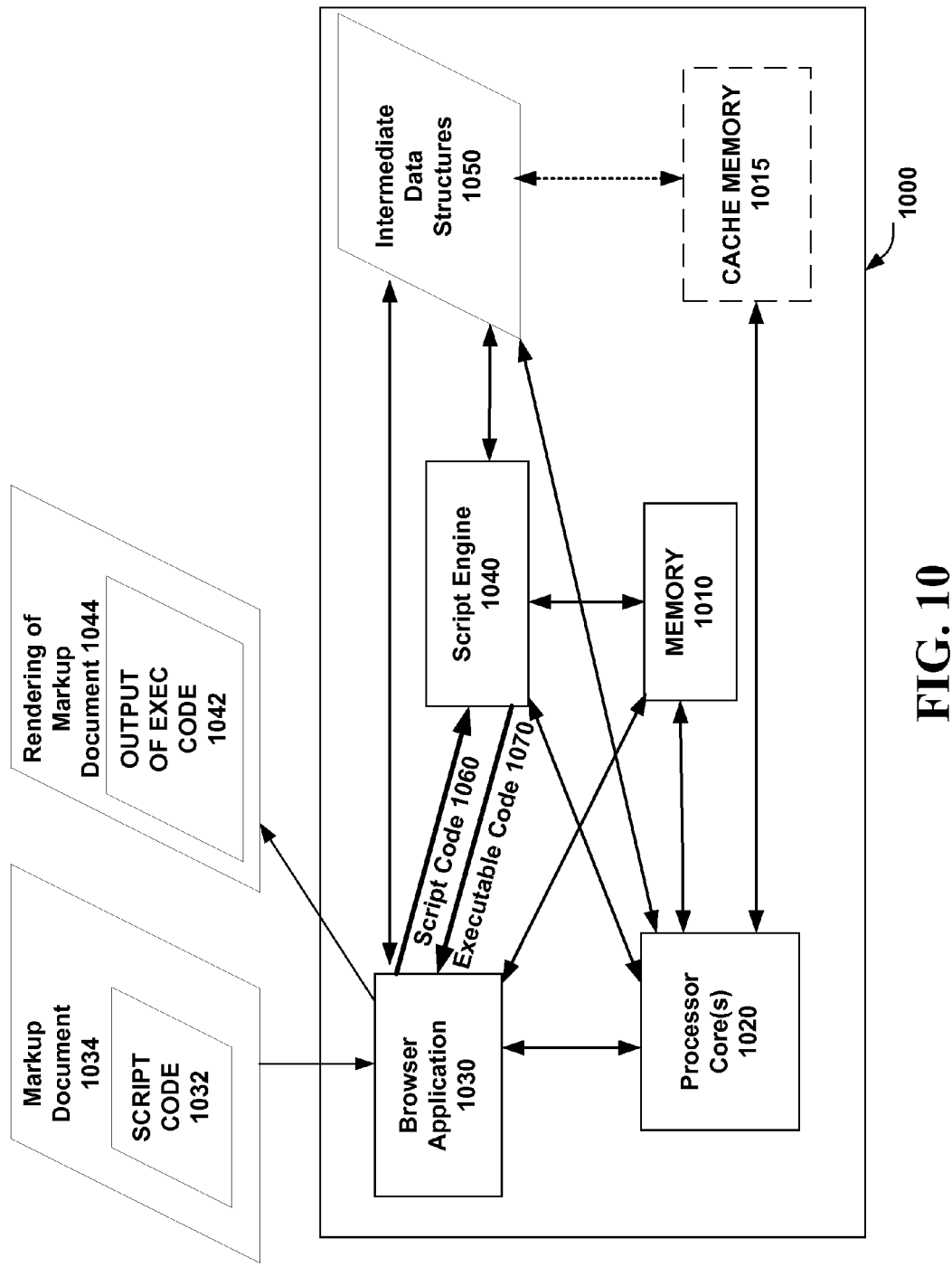
FIG. 10 is a block diagram illustrating an exemplary, non-limiting device including an interaction between a script engine and browser application according to various embodiments.

FIG. 10 is a block diagram illustrating an exemplary, non-limiting device 1000 including an interaction between a script engine 1040 and browser application 1030 according to various embodiments. As shown, a markup document 1034 including script code 1032 is received by a browser application 1030, which then forwards the script code 1060 to the script engine 1040 for intelligent code generation as described in one or more embodiments herein. In this regard, various intermediate data structure 1050 are maintained by which priorities are assigned to optimization of the various stages of code generation for a given piece of script code 1060. These structures can be maintained in memory 1010, and cached in cache memory 1015 where appropriate. As mentioned, in various embodiments, multiple processor cores 1020 are executing according to their division of labor as described in one or more embodiments above and to prioritize the user experience with a separate core. The script engine 1040 eventually passes back executable code 1070 to the browser application, at various levels of optimization or completion according to the various embodiments described herein. The primary core, in the meantime, handles rendering of the markup document 1044 as soon as it can finish its tasks without waiting for the script engine 1040 to complete its work on all work items, and the output of the executable code 1070 is represented as output 1042 of the markup document 1044.

In various embodiments, intelligent compilation techniques and heuristics are enabled that can make use of separate cores to speed up the generation of code for certain web page "hot spots", .e.g., areas of high interactivity by a client. The heuristics are customized for the web, e.g., a web cache of data structures can be used to guide code generation choices, for instance, by storing information in the cache about a last time a given web page was used, and then as a result, code for identified hot spots can be made faster. In this way, over time, since the same web sites tend to be called a lot, web site interpretation improves over time with reference to built up structures held in cache.

Some performance results have shown that the various embodiments and techniques described above contribute to a 40 to 150 times speed improvement over previous web page loads and interactions without application of the various embodiments described herein.

Exemplary Networked and Distributed Environments

One of ordinary skill in the art can appreciate that the various embodiments for dynamic code generation described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms for dynamic code generation as described for various embodiments of the subject disclosure.

Figure 11:
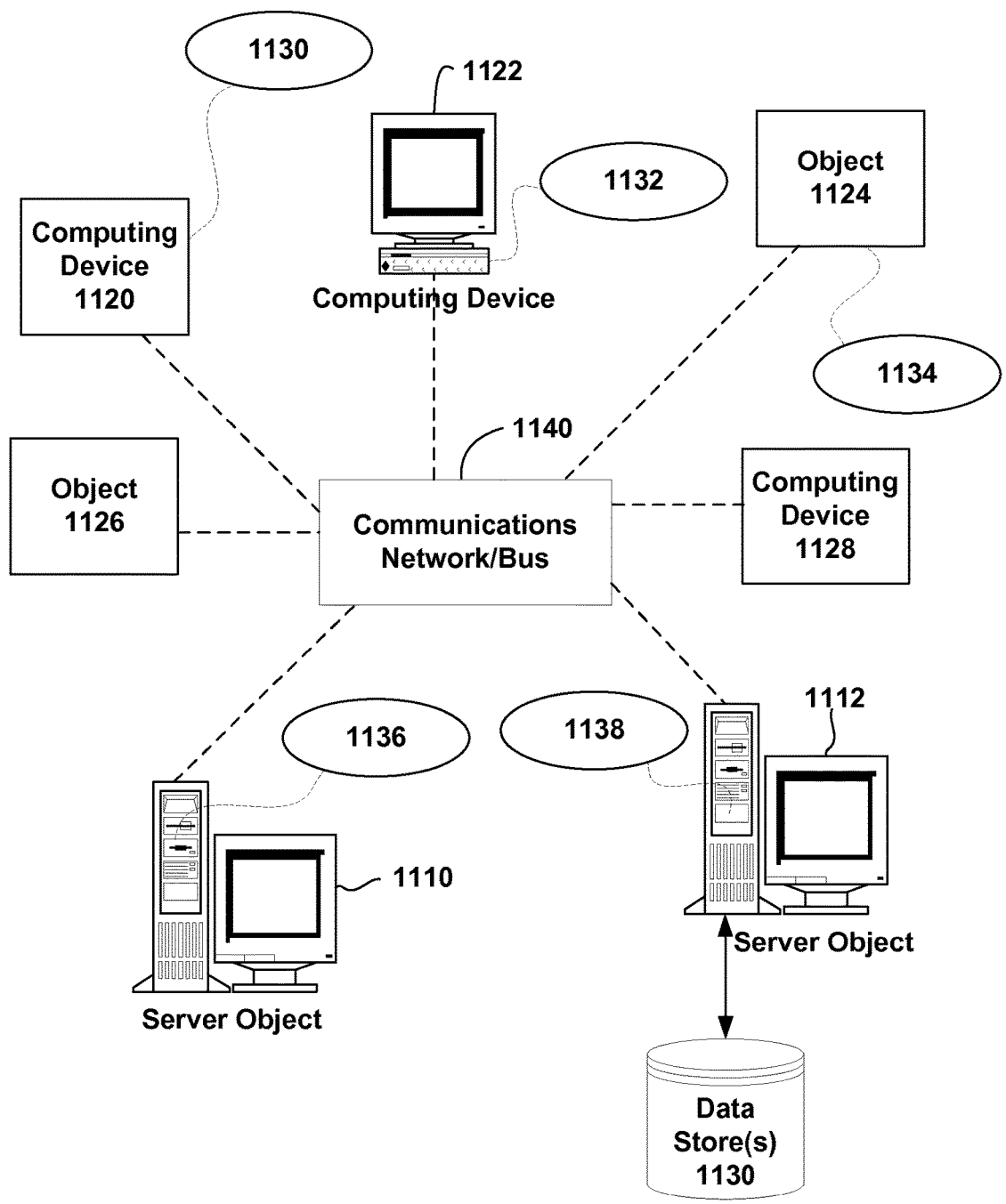
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques for dynamic code generation provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for dynamic code generation as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Exemplary Computing Device

As mentioned, advantageously, the techniques described herein can be applied to any device where it is desirable to perform dynamic code generation in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 12:
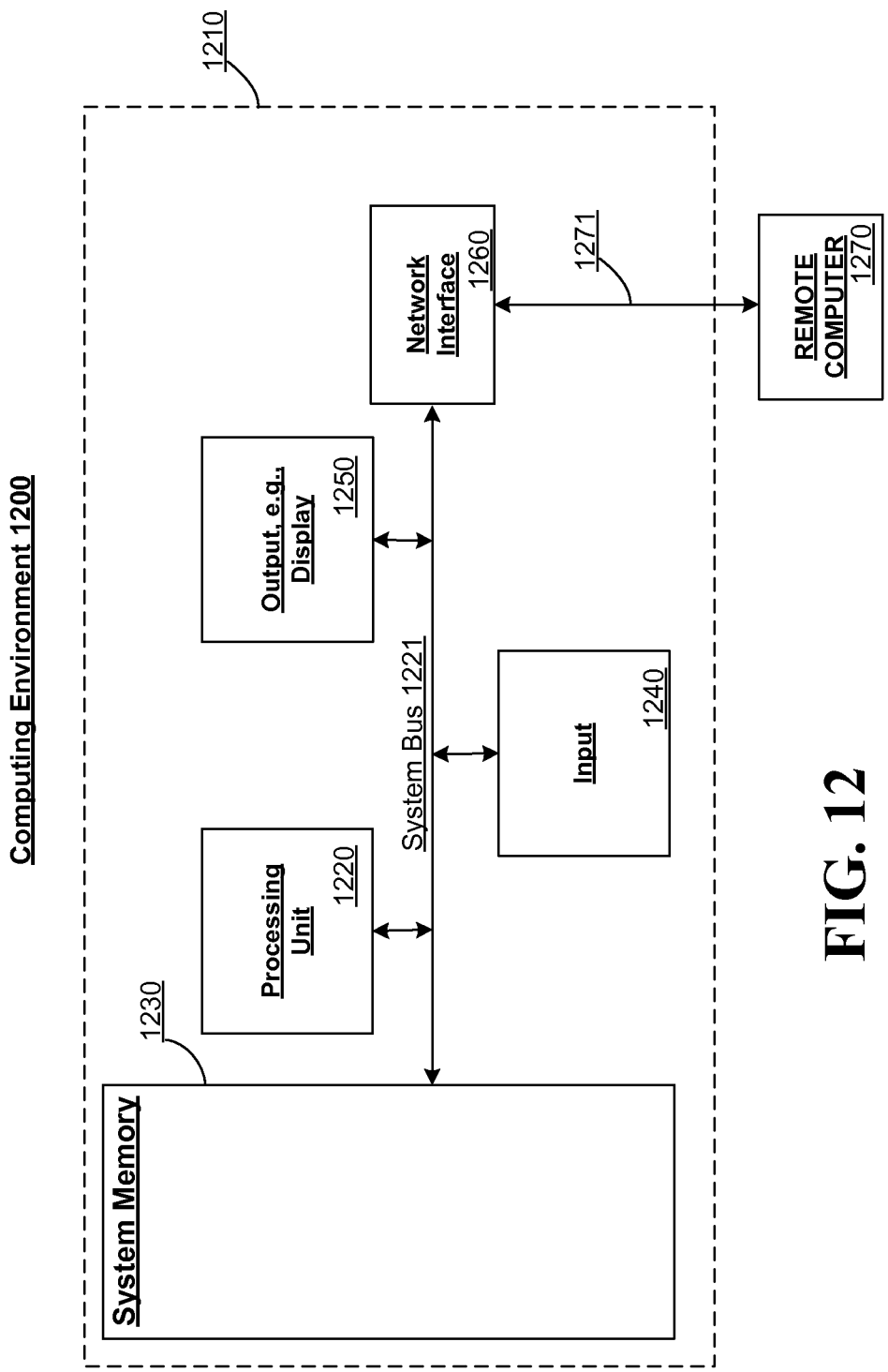
FIG. 12 is a block diagram representing an exemplary non-limiting computing system or operating environment in which one or more aspects of various embodiments described herein can be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing system environment 1200 be interpreted as having any dependency or requirement relating to any one or combination of components illustrated in the exemplary computing system environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data. According to a further example, computer 1210 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections, such as network interfaces 1260, to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A computing device, comprising:
  a memory having computer executable components stored thereon; and
  a processor communicatively coupled to the memory, the processor configured to facilitate execution of the computer executable components, the computer executable components comprising:
    a browser application configured to display a markup document including or referencing script code; and
    a script engine component configured to receive the script code, to analyze at runtime, a portion of the script code or usage of the portion of the script code during execution of the script code in the browser application, to determine a set of conditions under which performance of the portion of the script code increases when execution of a modified portion of the script code is executed in place of the portion of the script code, wherein, in response to the set of conditions being met, the modified portion of the script code is executed by the browser application instead of the portion of the script code.

2. The computing device of claim 1, wherein, in response to the set of conditions not being met, the portion of the script code is executed by the browser application.

3. The computing device of claim 1, wherein the portion of the script code is a loop body of the script code and the modified portion of the script code is a modified loop body of the script code.

4. The computing device of claim 1, wherein the portion of the script code pertains to a type of a variable of the script code and the modified portion of the script code is optimized for the type of the variable.

5. A computing device, comprising:
at least two processing cores and at least one memory;
a first processing core of the at least two processing cores configured to:
process a markup document to display content, the markup document including or referencing script code, the process including generate executable code that enables functionality represented by the script code of the markup document;
a second processing core of the at least two processing cores configured to:
based on a characteristic of the script code, selectively generate concurrently with the process on the first processing core, alternative executable code for a modified portion of the script code, wherein performance of the modified portion of the script code increases performance of the script code, wherein the alternative executable code is different from the executable code; and
substitute the executable code with the alternative executable code for further execution by the first processing core of the script code.

6. The computing device of claim 5, wherein substitute the executable code includes replace the executable code with the alternative executable code without interfering with a current execution of the executable code of by the first processing core.

7. The computing device of claim 5, wherein substitute the executable code includes swap in an address of the alternative executable code for further execution by the first processing core.

8. The computing device of claim 5, wherein selectively generate the alternative executable code includes generate the alternative executable code based on a priority assigned to the script code as represented in a set of priority work queues in which the script code is represented.

9. The computing device of claim 5, wherein generate the executable code by the first processing core includes generate interpreted code and wherein the selectively generate the alternative executable code by the second processing core includes generate modified code employing a just-in-time compiler.

10. The computing device of claim 5, wherein selectively generate the alternative executable code by the second processing core includes generate code that is modified for a type of a dynamic variable of the executable code that is inferred or observed for a set of circumstances applicable to execution of the executable code.

11. The computing device of claim 5, wherein the at least two processing cores is further configured to:
re-claim, by a third processing core of the at least two processing cores, memory for objects related to the markup document that are no longer used for the display of the markup document.

12. A method, comprising:
displaying, in a browser application of a computing device having at least one processor and a memory, a markup document including or referencing script code;
analyzing at runtime, by a script engine, a portion of the script code or usage of the portion of the script code during execution of the script code in a browser application, to determine a set of conditions under which performance of the portion of the script code increases when execution of a modified portion of the script code is executed in place of the portion of the script code; and
in response to the set of conditions being met, executing the modified portion of the script code instead of the portion of the script code.

13. The method of claim 12, further comprising:
in response to the set of conditions not being met, executing the portion of the script code.

14. The method of claim 12, wherein the portion of the script code is a loop body of the script code and the modified portion of the script code is a modified loop body of the script code.

15. The method of claim 12, wherein the portion of the script code pertains to a type of a variable of the script code and the modified portion of the script code is optimized for the type of the variable.

16. A method, comprising:
processing, on a first processing core of at least two processing cores, a markup document to display content, the markup document including or referencing script code, the processing including generating executable code that enables functionality represented by the script code of the markup document;
based on a characteristic of the script code, selectively generating, on a second processing core of the at least two processing cores, concurrently with the process on the first processing core, alternative executable code for a modified portion of the script code, wherein performance of the modified portion of the script code increases performance of the script code, wherein the alternative executable code is different from the executable code; and
substituting, by the second processing code, the executable code with the alternative executable code for further execution by the first processing core of the script code.

17. The method of claim 16, wherein substituting the executable code further comprises replacing the executable code with the alternative executable code without interfering with a current execution of the executable code of by the first processing core.

18. The method of claim 16, wherein substituting the executable code further comprises swapping in an address of the alternative executable code for further execution by the first processing core.

19. The method of claim 16, wherein selectively generating the alternative executable code further comprises generating the alternative executable code based on a priority assigned to the script code as represented in a set of priority work queues in which the script code is represented.

20. The method of claim 16, wherein generating the executable code by the first processing core further comprises generating interpreted code and wherein selectively generate the alternative executable code by the second processing core includes generate modified code employing a just-in-time compiler.

21. The method of claim 16, wherein selectively generating the alternative executable code by the second processing core further comprises generating code that is modified for a type of a dynamic variable of the executable code that is inferred or observed for a set of circumstances applicable to execution of the executable code.

22. The method of claim 16, further comprising:
reclaiming by a third processing core of the at least two processing cores, memory for objects related to the markup document that are no longer used for the display of the markup document.

23. A system, comprising:
at least one processor and a memory;
wherein the at least one processor is configured to:
display, in a browser application, a markup document including or referencing script code;
analyze at runtime, by a script engine, a portion of the script code or usage of the portion of the script code during execution of the script code in a browser application, to determine a set of conditions under which performance of the portion of the script code increases when execution of a modified portion of the script code is executed in place of the portion of the script code; and
in response to the set of conditions being met, execute the modified portion of the script code instead of the portion of the script code.

24. The system of claim 23, wherein the at least one processor is further configured to:
in response to the set of conditions not being met, execute the portion of the script code.

25. The system of claim 23, wherein the portion of the script code is a loop body of the script code and the modified portion of the script code is a modified loop body of the script code.

26. The system of claim 23, wherein the portion of the script code pertains to a type of a variable of the script code and the modified portion of the script code is optimized for the type of the variable.

27. A system, comprising:
at least two processing cores and a memory;
wherein a first processing core of the at least two processing cores is configured to:
process a markup document to display content, the markup document including or referencing script code, the process including generate executable code that enables functionality represented by the script code of the markup document; and
wherein a second processing core of the at least two processing cores is configured to:
based on a characteristic of the script code, selectively generate concurrently with the process on the first processing core, alternative executable code for a modified portion, wherein performance of the modified portion of the script code increases performance of the script code, wherein the alternative executable code is different from the executable code; and
substitute the executable code with the alternative executable code for further execution by the first processing core of the script code.

28. The system of claim 27, wherein the second processing core is further configured to replace the executable code with the alternative executable code without interfering with a current execution of the executable code of by the first processing core.

29. The system of claim 27, wherein the second processing core is further configured to swap in an address of the alternative executable code for further execution by the first processing core.

30. The system of claim 27, wherein the second processing core is further configured to generate the alternative executable code based on a priority assigned to the script code as represented in a set of priority work queues in which the script code is represented.

31. The system of claim 27, wherein the first processing core is further configured to generate interpreted code and wherein the second processor is further configured to generate modified code employing a just-in-time compiler.

32. The system of claim 27, wherein the second processing core is configured to generate code that is modified for a type of a dynamic variable of the executable code that is inferred or observed for a set of circumstances applicable to execution of the executable code.

33. The system of claim 27, further comprising a third processing core, wherein the third processing core is configured to reclaim memory for objects related to the markup document that are no longer used for the display of the markup document.

* * * * *